(12) United States Patent
Song et al.

(10) Patent No.: US 9,136,523 B2
(45) Date of Patent: Sep. 15, 2015

(54) RECHARGEABLE BATTERY

(75) Inventors: Jang-Hyun Song, Yongin-si (KR); Yong-Sam Kim, Yongin-si (KR)

(73) Assignees: Samsung SDI Co., Ltd., Yongin-Si, Gyeonggi-do (KR); Robert Bosch GMBH, Stuttgart (DE)

(*) Notice: Subject to any disclaimer, the term of this patent is extended or adjusted under 35 U.S.C. 154(b) by 136 days.

(21) Appl. No.: 13/467,153

(22) Filed: May 9, 2012

(65) Prior Publication Data

US 2013/0108916 A1 May 2, 2013

(30) Foreign Application Priority Data

Nov. 2, 2011 (KR) ........................ 10-2011-0113483

(51) Int. Cl.
*H01M 2/30* (2006.01)
*H01M 2/02* (2006.01)

(52) U.S. Cl.
CPC .................................... *H01M 2/305* (2013.01)

(58) Field of Classification Search
None
See application file for complete search history.

(56) References Cited

U.S. PATENT DOCUMENTS 8,038,487 B2 * 10/2011 Tsuchiya et al. ............. 439/765
2010/0047686 A1   2/2010 Tsuchiya et al.

FOREIGN PATENT DOCUMENTS

| JP | 2010-097764 | 4/2010 | |
|---|---|---|---|
| KR | 10-2009-0106547 | 10/2009 | |
| WO | WO 2009/150917 | * 12/2009 | .............. H01M 2/30 |

* cited by examiner

*Primary Examiner* — Cynthia K Walls
(74) *Attorney, Agent, or Firm* — Lee & Morse P.C.

(57) ABSTRACT

A rechargeable battery includes an electrode assembly inside a case, a terminal post located entirely outside of, and protruding outwardly from, the case, a connection terminal having a portion that passes through the case, the connection terminal electrically coupling the electrode assembly and the terminal post; and a sealing member enveloping the portion of the connection terminal that passes through the case and electrically insulating the connection terminal from the case.

20 Claims, 10 Drawing Sheets

RECHARGEABLE BATTERY

BACKGROUND

1. Field

The described technology relates generally to a rechargeable battery.

2. Description of the Related Art

A rechargeable battery can perform charging and discharging, unlike a primary battery, which cannot be charged. A small-capacity rechargeable battery may be used for a portable compact electronic device, such as a mobile phone, a laptop computer, and a camcorder. A large-capacity battery may be used as a motor driving power supply of a hybrid vehicle.

Recently, a high power rechargeable battery using a non-aqueous electrolyte having high energy density has been developed. The rechargeable battery cells may be formed in a cylindrical shape, a square shape, or the like. A plurality of the high power rechargeable batteries may be configured to form a large-capacity battery module by connecting the rechargeable battery cells in series. The high power rechargeable battery may be used for devices that require a large amount of power, for example, a motor drive of an electric vehicle and the like.

The above information disclosed in this Background section is only for enhancement of understanding of the background of the described technology and therefore it may contain information that does not form the prior art that is already known in this country to a person of ordinary skill in the art.

SUMMARY

According to an embodiment, there is provided a rechargeable battery including an electrode assembly inside a case, a terminal post located entirely outside of, and protruding outwardly from, the case, a connection terminal having a portion that passes through the case, the connection terminal electrically coupling the electrode assembly and the terminal post, and a sealing member enveloping the portion of the connection terminal that passes through the case and electrically insulating the connection terminal from the case.

The case includes a cap plate closing the case. The terminal post may protrude outwardly from the cap plate. The connection terminal may pass through the cap plate. The sealing member may be disposed around part of the terminal post and may electrically insulate the connection terminal from the cap plate.

The connection terminal may be electrically connected to the electrode assembly through a current collecting member. The connection terminal may include a terminal connection part in contact with the terminal post, a current collecting connection part coupled to the current collecting member, and an intermediate connection part formed between the terminal connection part and the current collecting connection part and curved at the terminal connection part and at the current collecting connection part.

The terminal connection part and the current collecting connection part may be parallel to the cap plate.

The terminal post may include a cylindrical terminal column and a terminal flange formed at a lower end of the terminal column. The terminal connection part of the connection terminal may include a connection terminal hole through which the terminal column passes. The connection terminal may be coupled to the terminal post by a nut fastened to the terminal column.

The rechargeable battery may further include an upper insulation member disposed at a lower portion of the terminal post. The upper insulation member may electrically insulate the terminal post and the cap plate, and the sealing member may cover the upper insulation member and the lower portion of the terminal post.

The cap plate may include a depression in which the upper insulation member is disposed. The sealing member may include an upper sealing part seated on the cap plate and a lower sealing part coupled to the cap plate through a terminal hole.

The terminal post includes a terminal flange formed at the lower end of the terminal post facing the cap plate. An upper insulation member may be disposed at a lower end of the terminal post, the upper insulation member insulating the terminal flange and the cap plate. The upper sealing part may include an upper sealing part hole in which the terminal flange of the terminal post is disposed and an upper sealing part groove below the upper sealing part hole in which the upper insulation member is disposed and covered by the upper sealing part.

The connection terminal may include a current collecting connection part. The lower sealing part may include a lower sealing part hole through which the connection terminal passes and a lower sealing part groove connected to the lower sealing part hole in which the current collecting connection part of the connection terminal is disposed.

The current collecting connection part may be bonded to a connecting portion of the current collecting member. The lower sealing part may cover the current collecting connection part and the connecting portion of the current collecting member.

The lower sealing part may include a support part supporting the connecting portion of the current collecting member and the current collecting connection part. The current collecting connection part and the connecting portion of the current collecting member may be disposed in a space defined by the support part.

A circumference of the lower sealing part may include a lower sealing part groove engaging a protrusion protruding from an inside portion of the terminal hole.

The protrusion may extend along a circumference direction at an interior circumference of the terminal hole. The lower sealing part groove may extend along the circumference of the lower sealing part.

The connection terminal may include a terminal connection part in contact with the terminal post. The terminal connection part may be coupled to the terminal post by a nut fastened to the terminal post. The upper sealing part may be disposed to cover the terminal connection part and the nut.

The connection terminal may include a terminal connection part in contact with the terminal post, an intermediate connection part curved at the terminal connection part and passing through the sealing member, and an electrode bonding part curved at the intermediate connection part to extend towards and to be bonded with a positive electrode uncoated region.

The sealing member may be formed by insert molding.

According to an embodiment, there is provided a rechargeable battery including an electrode assembly including a positive electrode and a negative electrode, a case having a space housing the electrode assembly, a cap plate coupled to the case, a terminal electrically connected to the electrode assembly and protruding to the outside of the cap plate, and a sealing member insulating the terminal and the cap plate from each other, the sealing member being formed by insert molding so as to cover the terminal at a terminal hole located at the cap plate.

The terminal may be electrically connected to the electrode assembly through a current collecting member. The sealing member may cover a portion of the terminal and an upper portion of the current collecting member.

An upper insulation member may be between the terminal and the cap plate. The sealing member may include a groove in which the upper insulation member is disposed.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
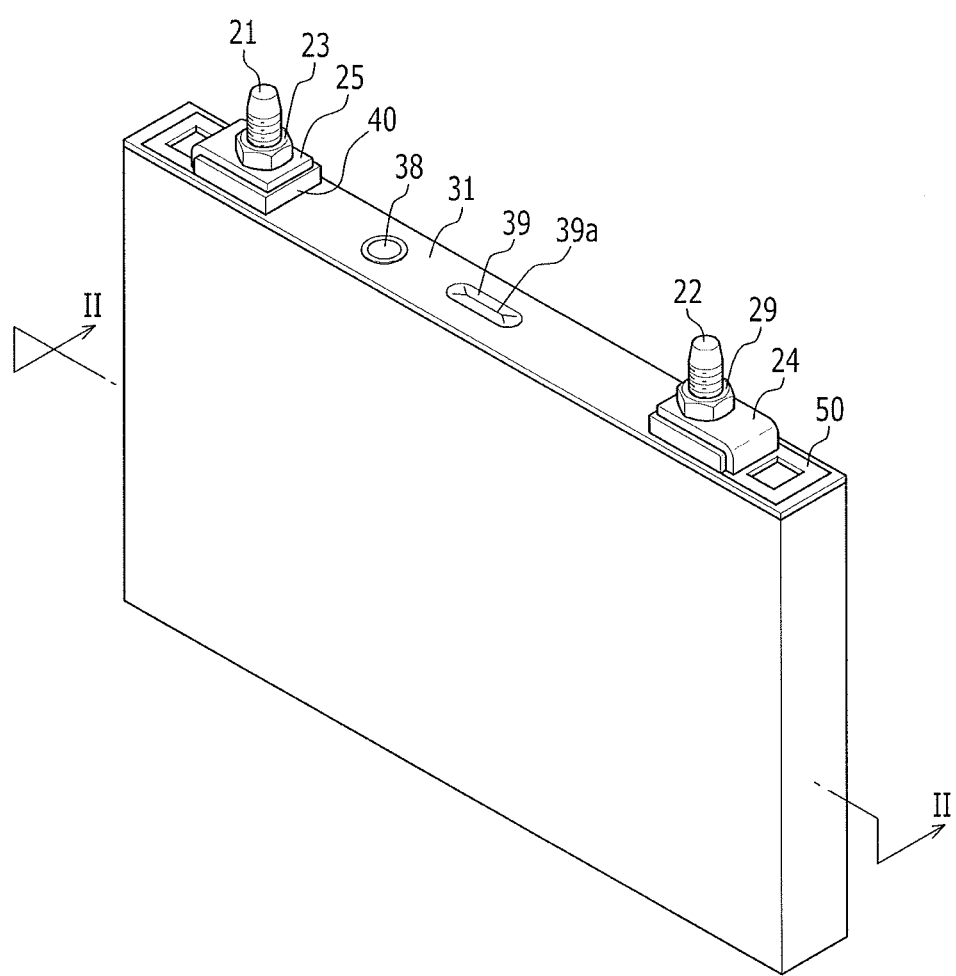
FIG. 1 illustrates a perspective view showing a rechargeable battery according to an exemplary embodiment.

Korean Patent Application No. 10-2011-0113483, filed on Nov. 2, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope thereof to those skilled in the art.

In the drawing figures, the dimensions of layers and regions may be exaggerated for clarity of illustration. Like reference numerals refer to like elements throughout.

Spatially relative terms, such as "lower," "upper," and the like, may be used herein for ease of description to describe one element or feature relationship to another element(s) or feature(s). Such terms may be understood with reference to orientation of such elements or features in the accompanying drawings. It is to be understood that the embodiments described herein may have different orientations in use or operation what is depicted in the figures.

Figure 2:
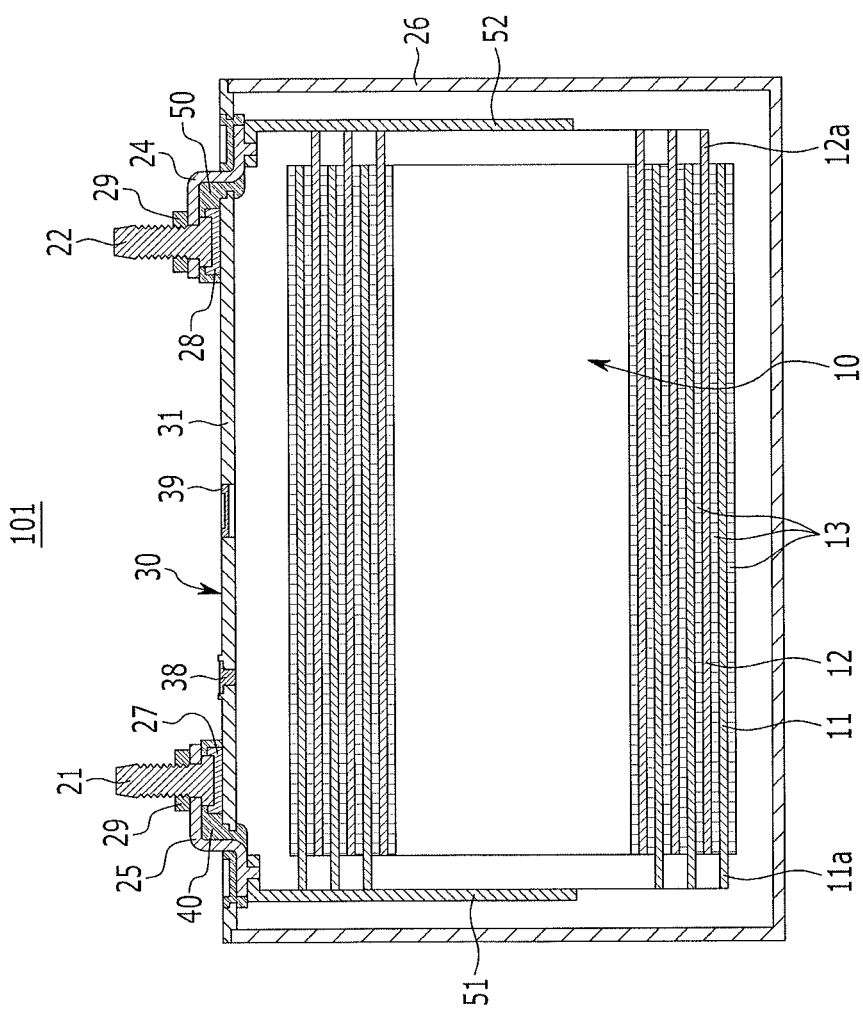
FIG. 2 illustrates a cross-sectional view taken along line II-II of FIG. 1.

FIG. 1 is a perspective view showing a rechargeable battery according to an exemplary embodiment and FIG. 2 is a cross-sectional view taken along line II-II of FIG. 1.

Referring to FIGS. 1 and 2, a rechargeable battery 101 according to an exemplary embodiment may include an electrode assembly 10 wound by interposing a separator 13 between a positive electrode (first electrode) 11 and a negative electrode (second electrode) 12, a case 26 housing the electrode assembly 10, and a cap assembly 30 coupled to an opening of the case 26.

The rechargeable battery 101 according to the exemplary embodiment of FIG. 1 may be a lithium ion secondary battery and may have a square shape. However, in other implementations, various types of electrodes, such as the electrodes of a lithium polymer battery, and various shapes of electrodes, such as a cylindrical electrode, or the like, may be used.

The positive electrode 11 and the negative electrode 12 may each include a coating region in which an active material is coated on a current collector formed by a thin-film metal foil and an uncoated region in which the active material is not coated.

A positive electrode uncoated region 11a may be formed at one side end of the positive electrode 11 along a length direction of the positive electrode 11. A negative uncoated region 12a may be formed at the other side end of the negative electrode 12 along a length direction of the negative electrode 12. In addition, the positive electrode 11 and the negative electrode 12 may be wound with the separator 13 as an insulator interposed therebetween.

In other implementations, the electrode assembly 10 may be formed as a structure in which a positive electrode and a negative electrode are formed as a plurality of sheets that are stacked with a separator interposed therebetween.

The case 26 may be formed in a substantially cuboid shape. An opening may be formed at one surface thereof. The cap assembly 30 may include a cap plate 31 covering the opening of the case 26, a positive electrode draw-out terminal or terminal post 21 disposed on the cap plate 31 and electrically connected with the positive electrode 11, a negative electrode draw-out terminal or terminal post 22 disposed on the cap plate 31 and electrically connected with the negative electrode 12, and a vent member 39 having a notch 39a that may be broken according to a set internal pressure.

The cap plate 31 may be formed as a thin metal plate. A sealing cap 38 sealing an electrolyte injection opening formed at one side thereof may be fixed and installed at the cap plate 31.

The positive electrode terminal post 21 may be electrically connected and installed with the positive electrode 11. A connection terminal 25 may be fixed and installed on the positive electrode terminal post 21. The connection terminal 25 may be electrically connected with the positive electrode 11 through a current collecting member 51. An upper insulation member 27 into which a terminal flange 21b formed at the positive electrode terminal post 21 is inserted may be installed below the positive electrode terminal post 21. A sealing member 40 partially covering the positive electrode terminal post 21 and the connection terminal 25 may be fixed and installed at the cap plate 31. A positive electrode terminal may be configured by the positive electrode terminal post 21 and the connection terminal 25.

The negative electrode terminal post 22 may be electrically connected and installed with the negative electrode 12, a connection terminal 24 may be fixed and installed at the negative electrode terminal post 22, and the connection terminal 24 may be electrically connected with the negative electrode 12 through a current collecting member 52. An upper insulation member 28 into which a lower end of the negative electrode terminal post 22 is inserted may be installed below the negative electrode terminal post 22. A sealing member 50 partially covering the negative electrode terminal post 22 and the connection terminal 24 may be fixed and installed at the cap plate 31. A negative electrode terminal may be configured by the negative electrode terminal post 22 and the connection terminal 24.

Figure 3:
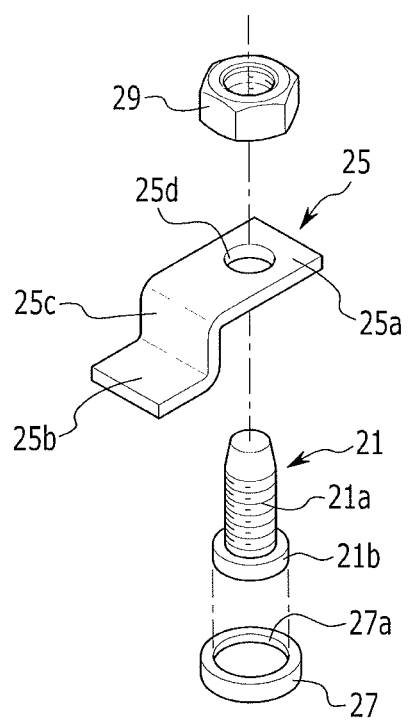
FIG. 3 illustrates an exploded perspective view of a terminal and members coupled thereto of the rechargeable battery according to the exemplary embodiment of FIG. 1.
Figure 4:
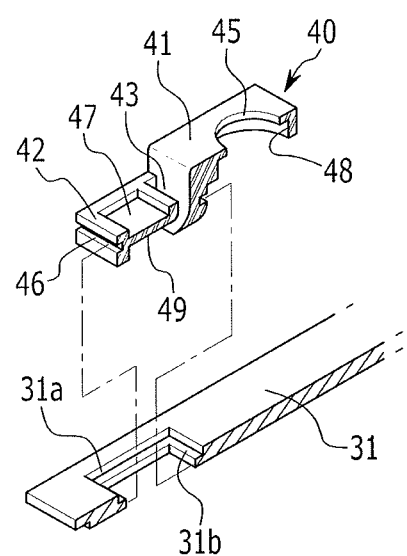
FIG. 4 illustrates an exploded perspective view showing a cap plate and a sealing member of the rechargeable battery according to the exemplary embodiment of FIG. 1.

FIG. 3 is an exploded perspective view of a terminal and members coupled thereto of a rechargeable battery according to the exemplary embodiment of FIG. 1. FIG. 4 is an exploded perspective view showing a cap plate and a sealing member of the rechargeable battery according to the exemplary embodiment.

Referring to FIGS. 3 and 4, the positive electrode terminal post and members coupled thereto will be described in detail. The negative electrode terminal post 22 and the members coupled thereto may be formed with a symmetrical structure with respect to the positive electrode terminal post 21 and the members coupled thereto. Therefore, the description of the positive electrode terminal post 21 and the members coupled thereto may be considered to also provide a description of the negative electrode terminal post 22 and the members connected thereto.

The positive electrode terminal post 21 may be formed in a column shape and may include a terminal column 21a having a screw thread at an external circumference thereof and a terminal flange 21b formed below the terminal column 21a. The terminal column 21a may be formed in a substantially cylindrical shape. The terminal flange 21b may be formed so as to have a cross-sectional area larger than the terminal column 21a. The upper insulation member 27 may be disposed between the cap plate 31 and the positive electrode terminal post 21 to insulate the positive electrode terminal post 21 and the cap plate 31. The upper insulation member 27 may have a groove 27a into which the terminal flange 21b is inserted.

The connection terminal 25 may be formed in a plate shape and may include a terminal connection part 25a having a hole 25d into which the terminal column 21a is inserted, a current collecting connection part 25b fixed to the current collecting member 51, and an intermediate connection part 25c formed between the terminal connection part 25a and the current collecting connection part 25b and curved at the terminal connection part 25a and at the current collecting connection part 25b.

The terminal connection part 25a may fit around the terminal column 21a to be in contact with the terminal flange 21b. The terminal connection part 25a may be fixed to the positive electrode terminal post 21 by a nut 29 installed at the upper portion thereof. A protrusion 25d (shown in FIG. 2) that engages a corresponding indentation or hole in the current collecting member 51 may be formed at the current collecting connection part 25b. The current collecting connection part 25b may be bonded to the current collecting member 51 by welding.

The intermediate connection part 25c may be curved at a substantially right angle at the terminal connection part 25a and at the current collecting connection part 25b to connect the terminal connection part 25a and the current collecting connection part 25b. The intermediate connection part 25c may be inserted to an opening 43 formed in the sealing member 40.

The terminal connection part 25a and the current collecting connection part 25b may be disposed to be parallel to the cap plate 31. The intermediate connection part 25c may be disposed to be perpendicular to the terminal connection part 25a and the current collecting connection part 25b.

The sealing member 40 may include an upper sealing part 41 seated on the cap plate 31 and a lower sealing part 42 inserted into and fixed to a terminal hole 31a formed at the cap plate 31. A hole 45 into which the terminal flange 21b is inserted may be formed at the upper sealing part 41. A groove 48 covering the upper insulation member 27 may be formed below the hole 45.

An opening 43 into which the connection terminal 25 is inserted may be formed at the lower sealing part 42. A groove 49 connected with the opening 43, into which the current collecting connection part 25b is inserted, may be formed on the lower surface thereof. The opening 43 may be formed to pass through the cap plate.

Further, a groove 47 may be formed on the upper surface of the lower sealing part 42. A groove 46 that fits into a protrusion 31b protruding toward the inside from the terminal hole 31a may be formed at the circumference of the lower sealing part 42. The protrusion 31b may be formed by to extend along a circumferential direction at an interior circumference of the terminal hole 31a. The groove 46 may be formed to extend along the circumference of the lower sealing part 42 so as to fit the protrusion 31b. Accordingly, the sealing member 40 may be stably fixed to the cap plate 31.

The sealing member 40 may be formed by an insert molding method while the positive electrode terminal post 21, the connection terminal 25, and the upper insulation member 27 are installed on the cap plate 31. Accordingly, the sealing member 40 may be formed and simultaneously, fixed and installed to the cap plate 31 and may be stably fixed on the cap plate 31 while covering the positive electrode terminal post 21, the upper insulation member 27, and the connection terminal 25.

The terminal connection part 25a may be fixed by the nut 29 and the current collecting connection part 25b may be fixed by the sealing member 40. Accordingly, the connection terminal 25 may prevent an electrical connection of the positive electrode terminal post 21 and the connection terminal 25 from being deteriorated due to external vibration or impact.

Figure 5:
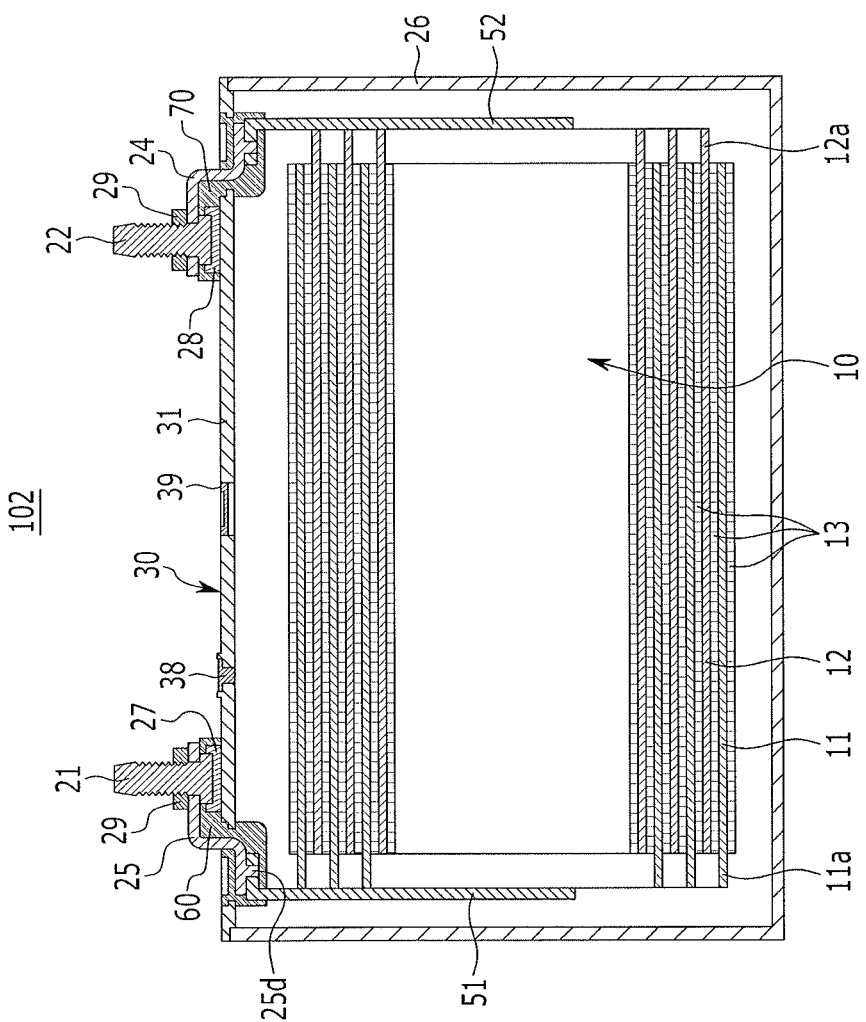
FIG. 5 illustrates a cross-sectional view of a rechargeable battery according to another exemplary embodiment.
Figure 6:
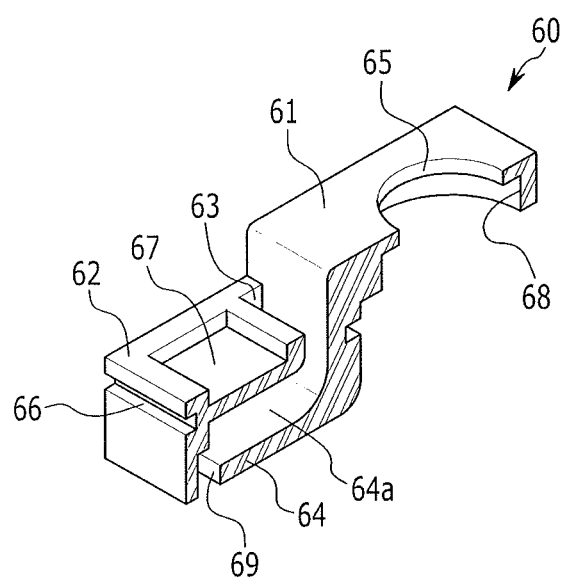
FIG. 6 illustrates a cut perspective view of a sealing member of the rechargeable battery according to the exemplary embodiment of FIG. 5.

FIG. 5 is a cross-sectional view of a rechargeable battery according to another exemplary embodiment and FIG. 6 is a cut perspective view of a sealing member of the rechargeable battery according to this exemplary embodiment.

Referring to FIGS. 5 and 6, since a rechargeable battery 102 according to this exemplary embodiment has substantially the same structure as the rechargeable battery according to the exemplary embodiment of FIG. 1, except for a structure of a sealing member 60, a description of the similar features will not be repeated.

The sealing member 60 installed at the positive electrode terminal post 21 may be formed with a symmetrical structure to a sealing member 70 installed at the negative electrode terminal post 22. Accordingly, for a description of the sealing member 70 installed at the negative electrode terminal post 22, one may refer to the description of the sealing member 60 installed at the positive electrode terminal post 21.

The sealing member 60 may include an upper sealing part 61 seated on the cap plate 31 and a lower sealing part 62 inserted and fixed to the terminal hole 31a formed at the cap plate 31. A hole 65 into which the positive electrode terminal post 21 is inserted may be formed at the upper sealing part 61, and a groove 68 covering the upper insulation member 27 may be formed below the hole 65.

An opening 63 into which the connection terminal 25 is inserted may be formed at the lower sealing part 62. A support part 64 supporting and covering the current collecting connection part 25*b* and a connecting portion of the current collecting member 51 therebelow may be formed at the lower surface thereof. A space 64*a* may be formed at the inside of the support part 63. The space 64*a* may be formed to be connected with the opening 63. The current collecting connection part 25*b* and the connecting portion of the current collecting member 51 may be inserted to the space 64*a*. The space 64*a* may be formed to cover a portion where the connection terminal 25 and the connecting portion of the current collecting member 51 are bonded with each other. An opening 69 communicating with the space 64*a* may be formed at the lower surface of the lower sealing part 62 so that the current collecting member 51 may protrude downwards.

As described above, according to the exemplary embodiment, the sealing member 60 may be installed to cover the positive electrode terminal post 21, the connection terminal 25, and the connecting portion of the current collecting member 51, such that it may be possible to reduce contact resistance between the positive electrode terminal post 21 and the connection terminal 25 and reduce contact resistance between the connection terminal 25 and the current collecting member 51.

The support part 64 of the sealing member 60 may stably support the electrode assembly 10 by supporting the current collecting member 51 at the upper portion, such that it may be possible to prevent the electrode assembly 10 from being damaged due to external impact or vibration.

Figure 7:
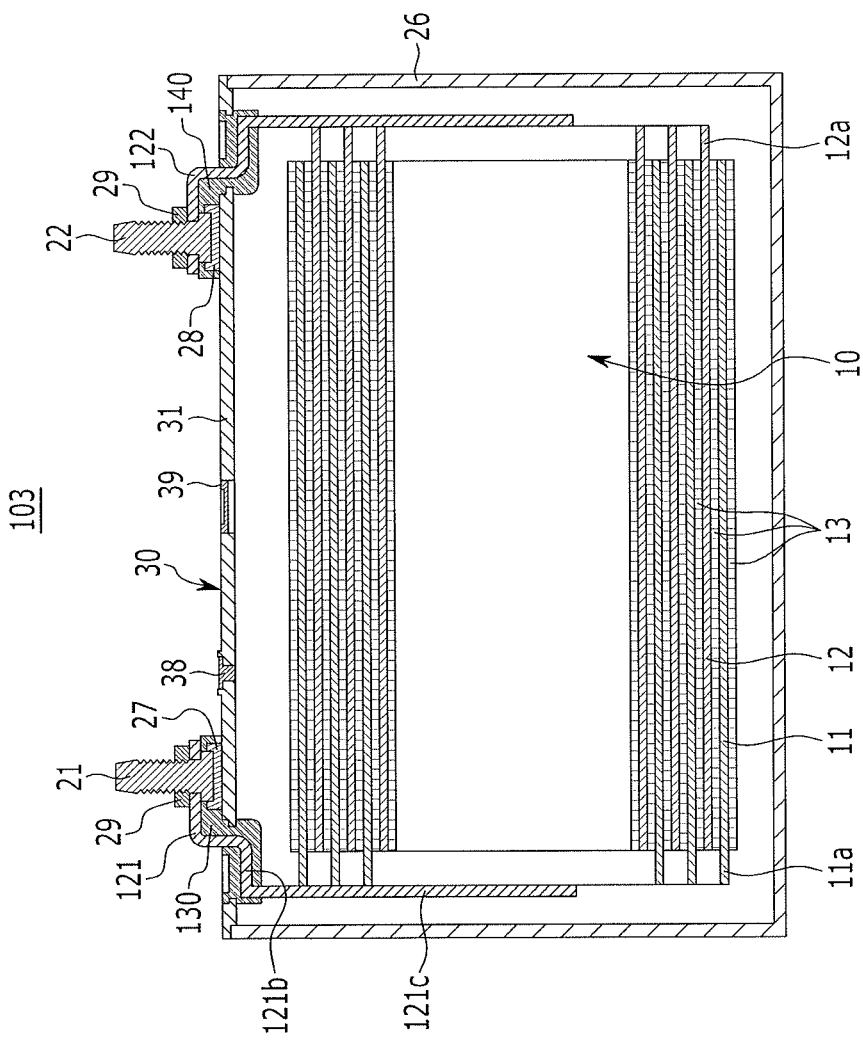
FIG. 7 illustrates a cross-sectional view showing a rechargeable battery according to another exemplary embodiment.
Figure 8:
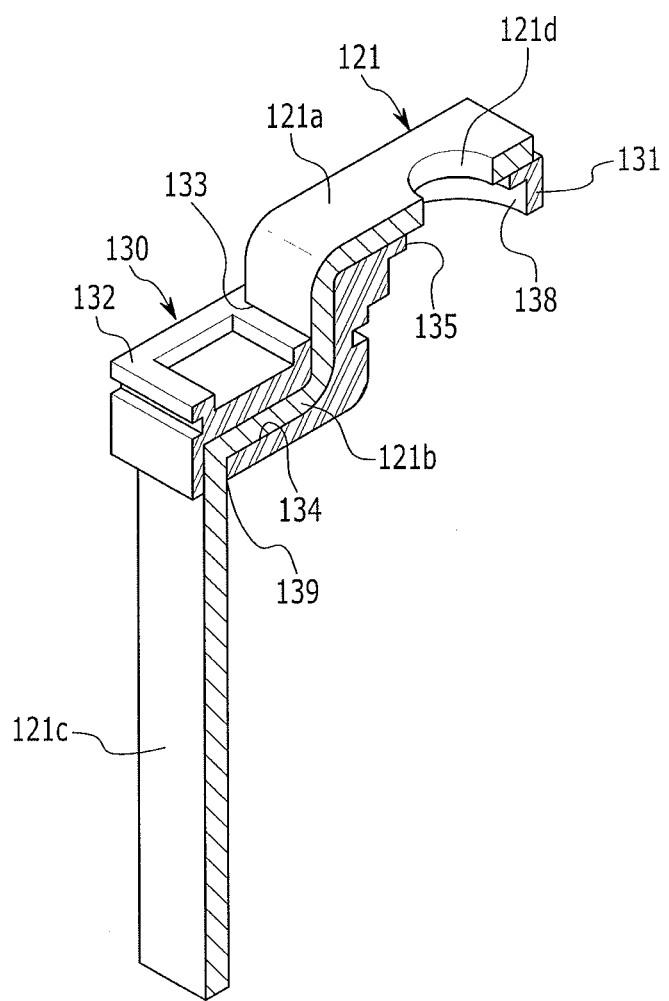
FIG. 8 illustrates a cut perspective view showing a sealing member and a connection terminal of the rechargeable battery according to the exemplary embodiment of FIG. 7.

FIG. 7 is a cross-sectional view showing a rechargeable battery according to another exemplary embodiment and FIG. 8 is a cut perspective view showing a sealing member and a connection terminal of the rechargeable battery according to this exemplary embodiment.

Referring to FIGS. 7 and 8, a rechargeable battery 103 according to the exemplary embodiment may have the same structure as the rechargeable battery according to the exemplary embodiment of FIG. 1, except for the structure of a sealing member 130 and a connection terminal 121. Accordingly, a description of similar structures will not be repeated.

The sealing member 130 and the connection terminal 121 installed at the positive electrode terminal post 21 may be formed with a symmetrical structure to a sealing member 140 and a connection terminal 122 installed at the negative electrode terminal post 22. Accordingly for a description of the sealing member 140 and the connection terminal 122 installed at the negative electrode terminal post 22, one may refer to the description of the sealing member 130 and the connection terminal 121 installed at the positive electrode terminal post 21.

The connection terminal 121 may include a terminal connection part 121*a* having a hole 125 into which the positive electrode terminal post 21 is inserted, an intermediate connection part 121*b* curved at the terminal connection part 121*a* to be inserted in the sealing member 130, and an electrode bonding part 121*c* curved at the intermediate connection part 121*b* to extend downwards and be bonded to the positive electrode uncoated region 11*a*. The terminal connection part 121*a* may be disposed to be parallel to the cap plate 31. The intermediate connection part 121*b* may be formed in a bent shape toward the electrode bonding part 121*c* at the terminal connection part 121*a*.

The sealing member 130 may include an upper sealing part 131 seated on the cap plate 31 and a lower sealing part 132 that is inserted into and fixed to the hole formed at the cap plate 31. An opening 135 into which the positive electrode terminal post 21 is inserted may be formed at the upper sealing part 131, and a groove 138 into which the upper insulation member 27 fits may be formed below the opening 135.

The lower sealing part 132 may be formed to cover the intermediate connection part 121*b*. A space 134 covering the intermediate connection part 121*b* may be formed at the lower sealing part 132. Further, an opening 133 into which the intermediate connection part 121*b* is inserted may be formed at the upper end of the space 134 and an opening 139 may be formed at the lower surface of the space 134 so that the electrode bonding part 121*c* protrudes downwards. The electrode bonding part 121*c* may be curved in the lower sealing part 132 to extend downwards.

As described above, according to the exemplary embodiment, the sealing member 130 may be formed to cover the positive electrode terminal post 21 and the connection terminal 121. The electrode bonding part 121*c* bonded to the positive electrode uncoated region 11*a* may be formed at the connection terminal 121, such that the sealing member 130 can stably support the positive electrode terminal post 21 and the connection terminal 121.

Figure 9:
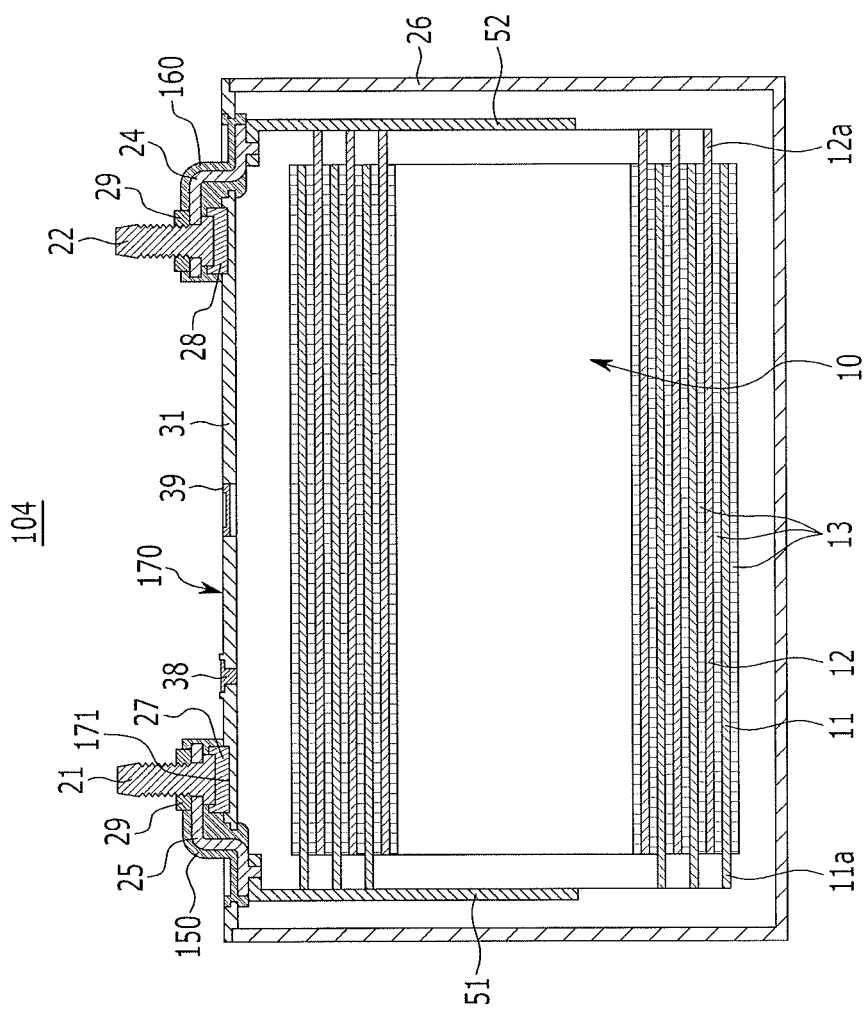
FIG. 9 illustrates a cross-sectional view showing a rechargeable battery according to another exemplary embodiment.
Figure 10:
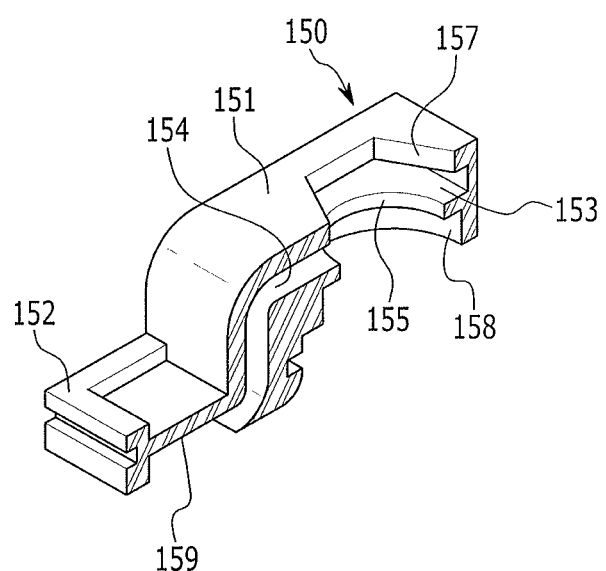
FIG. 10 illustrates a cut perspective view showing a sealing member of the rechargeable battery according to the exemplary embodiment of FIG. 9.

FIG. 9 is a cross-sectional view showing a rechargeable battery according to another exemplary embodiment, and FIG. 10 is a cut perspective view showing a sealing member of the rechargeable battery according to the exemplary embodiment of FIG. 9.

Referring to FIGS. 9 and 10, a rechargeable battery 104 according to the exemplary embodiment has the same structure as the rechargeable battery according to the exemplary embodiment of FIG. 1, except for a structure of a sealing member 150. Accordingly, a description of similar features will not be repeated.

The sealing member 150 installed at the positive electrode terminal post 21 may be formed with a symmetrical structure with respect to a sealing member 160 installed at the negative electrode terminal post 22. Accordingly, for a description of the sealing member 160 installed at the negative electrode terminal post 22, one may refer to the description of the sealing member 150 installed at the positive electrode terminal post 21.

The sealing member 150 may include an upper sealing part 151 seated on the cap plate 31 and a lower sealing part 152 inserted into and fixed to the hole formed at the cap plate 170. A hole 155 into which the positive electrode terminal post 21 is inserted may be formed at the upper sealing part 151, and a groove 158 into which the upper insulation member 27 is inserted may be formed below the hole 155.

A support wall 153 covering the connection terminal 25 may be formed above the hole 155, and a space 154 into which the terminal connection part 25*a* and the intermediate connection part 25*c* are inserted may be formed at the inside of the support wall 153. A nut support part 157 partially covering a nut 29 fastened to the positive electrode terminal post 21 may be formed above the space 154. A groove 159 into which the current collecting connection part 25*b* is inserted may be formed at the lower sealing part 62.

A groove 171 into which the upper insulation member 27 is inserted may be formed at the cap plate 170. Accordingly, the upper insulation member 27 and the positive electrode terminal post 21 may be easily installed at a predetermined position.

After the upper insulation member 27 is installed on the cap plate 170, the positive electrode terminal post 21 may be fitted on the upper insulation member 27. The sealing member 150 may be formed by insert molding with the connection terminal 25 and the nut 29 installed at the positive electrode terminal post 21. Accordingly, the sealing member 150 may be easily formed so as to cover the upper insulation member 27, the positive electrode terminal post 21, the connection terminal 25, and the nut 29. According to the exemplary embodiment, when the sealing member 150 is formed so as to cover the positive electrode terminal post 21, the connection terminal 25, and the nut 29, it may be possible to prevent the nut 29 from being released from the terminal due to external vibration, such that the positive electrode terminal post 21 and the connection terminal 25 may be more stably coupled to each other.

By way of summation and review, a rechargeable battery may have a terminal protruding outside the case. Accordingly, it is desirable to stably seal between the terminal and a cap plate. If a gasket for sealing is installed between the terminal and the cap plate, an assembly process may be complicated and it may be difficult to achieve a stable sealing effect.

The embodiments disclosed herein may advance the art by providing a sealing member that is installed to cover a terminal post and a connection terminal together, such that it may be possible to stably fix and seal the terminal post and the connection terminal. Further, the sealing member may be formed by insert molding, such that it may be possible to easily install the terminal and the sealing member at a cap plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery, comprising:
an electrode assembly inside a case;
a terminal post located entirely outside of, and protruding outwardly from, the case;
a connection terminal having a portion that passes through the case, the connection terminal electrically coupling the electrode assembly and the terminal post; and
a sealing member contacting the terminal post and enveloping the portion of the connection terminal that passes through the case and electrically insulating the connection terminal from the case, wherein the connection terminal has an integral one-piece structure with a first end in direct contact with the terminal post and a second end within the case, wherein a first portion of the sealing member is located within the case adjacent to and in direct contact with the second end of the connection terminal within the case, and wherein the connection terminal is between the sealing member and the terminal post.

2. The rechargeable battery as claimed in claim 1, wherein:
the case includes a cap plate closing the case,
the terminal post protrudes outwardly from the cap plate,
the connection terminal passes through the cap plate; and
the sealing member has a second portion which is disposed around at least part of the terminal post and electrically insulates the connection terminal from the cap plate.

3. The rechargeable battery as claimed in claim 2, wherein:
the connection terminal is electrically connected to the electrode assembly through a current collecting member.

4. The rechargeable battery as claimed in claim 3, wherein:
the connection terminal includes:
a terminal connection part in contact with the terminal post,
a current collecting connection part coupled to the current collecting member, and
an intermediate connection part formed between the terminal connection part and the current collecting connection part and curved at the terminal connection part and at the current collecting connection part.

5. The rechargeable battery as claimed in claim 4, wherein:
the terminal connection part and the current collecting connection part are parallel to the cap plate.

6. The rechargeable battery as claimed in claim 4, wherein:
the terminal post includes a cylindrical terminal column and a terminal flange formed at a lower end of the terminal column,
the terminal connection part of the connection terminal includes a connection terminal hole through which the terminal column passes, and
the connection terminal is coupled to the terminal post by a nut fastened to the terminal column.

7. The rechargeable battery as claimed in claim 2, further including
an upper insulation member disposed at a lower portion of the terminal post, the upper insulation member electrically insulating the terminal post and the cap plate, and the sealing member covering the upper insulation member and the lower portion of the terminal post.

8. The rechargeable battery as claimed in claim 7, wherein:
the cap plate includes a depression in which the upper insulation member is disposed.

9. The rechargeable battery as claimed in claim 3, wherein:
the sealing member includes an upper sealing part seated on the cap plate and a lower sealing part coupled to the cap plate through a terminal hole.

10. The rechargeable battery as claimed in claim 9, wherein:
the terminal post includes a terminal flange formed at a lower end of the terminal post facing the cap plate,
an upper insulation member is disposed at the lower end of the terminal post, the upper insulation member insulating the terminal flange and the cap plate,
the upper sealing part includes an upper sealing part hole in which the terminal flange of the terminal post is disposed, and an upper sealing part groove below the upper sealing part hole in which the upper insulation member is disposed and covered by the upper sealing part.

11. The rechargeable battery as claimed in claim 9, wherein:
the connection terminal includes a current collecting connection part, and
the lower sealing part includes a lower sealing part hole through which the connection terminal passes and a lower sealing part groove connected to the lower sealing part hole in which the current collecting connection part of the connection terminal is disposed.

12. The rechargeable battery as claimed in claim 9, wherein:
a current collecting connection part is bonded to a connecting portion of the current collecting member, and
the lower sealing part covers the current collecting connection part and the connecting portion of the current collecting member.

13. The rechargeable battery as claimed in claim 12, wherein:
the lower sealing part includes a support part supporting the connecting portion of the current collecting member and the current collecting connection part, and
the current collecting connection part and the connecting portion of the current collecting member are disposed in a space defined by the support part.

14. The rechargeable battery as claimed in claim 9, wherein:
a circumference of the lower sealing part includes a lower sealing part groove engaging a protrusion protruding from an inside portion of the terminal hole.

15. The rechargeable battery as claimed in claim 14, wherein:
the protrusion extends along a circumference direction at an interior circumference of the terminal hole, and
the lower sealing part groove extends along the circumference of the lower sealing part.

16. The rechargeable battery as claimed in claim 10, wherein:
the connection terminal includes a terminal connection part in contact with the terminal post, the terminal connection part being coupled to the terminal post by a nut fastened to the terminal post, and
the upper sealing part is disposed to cover the terminal connection part and the nut.

17. The rechargeable battery as claimed in claim 1, wherein:
the connection terminal includes a terminal connection part in contact with the terminal post, an intermediate connection part curved at the terminal connection part and passing through the sealing member, and an electrode bonding part curved at the intermediate connection part to extend towards and to be bonded with a positive electrode uncoated region.

18. A rechargeable battery, comprising:
an electrode assembly including a positive electrode and a negative electrode;
a case having a space housing the electrode assembly, the case including a cap plate that closes the space housing the electrode assembly;
a terminal post located entirely outside of, and protruding outwardly from, the case;
a connection terminal connected between the terminal post and the electrode assembly, the connection terminal having a portion protruding outside of the cap plate and a portion that passes through the cap plate, and
a sealing member insulating the terminal and the cap plate from each other, the connection terminal having an integral one-piece structure with a first end in direct contact with the terminal post and a second end within the case, the sealing member extending into the case adjacent to and in direct contact with the second end of the connection terminal within the case, the sealing member being formed by insert molding so as to cover the terminal at a terminal hole located at the cap plate and contacting the terminal post.

19. The rechargeable battery as claimed in claim 18, wherein:
the terminal is electrically connected to the electrode assembly through a current collecting member, and
the sealing member covers a portion of the terminal and an upper portion of the current collecting member.

20. The rechargeable battery as claimed in claim 18, wherein:
an upper insulation member is between the terminal and the cap plate, and
the sealing member includes a groove in which the upper insulation member is disposed.

* * * * *